Patented Feb. 22, 1938

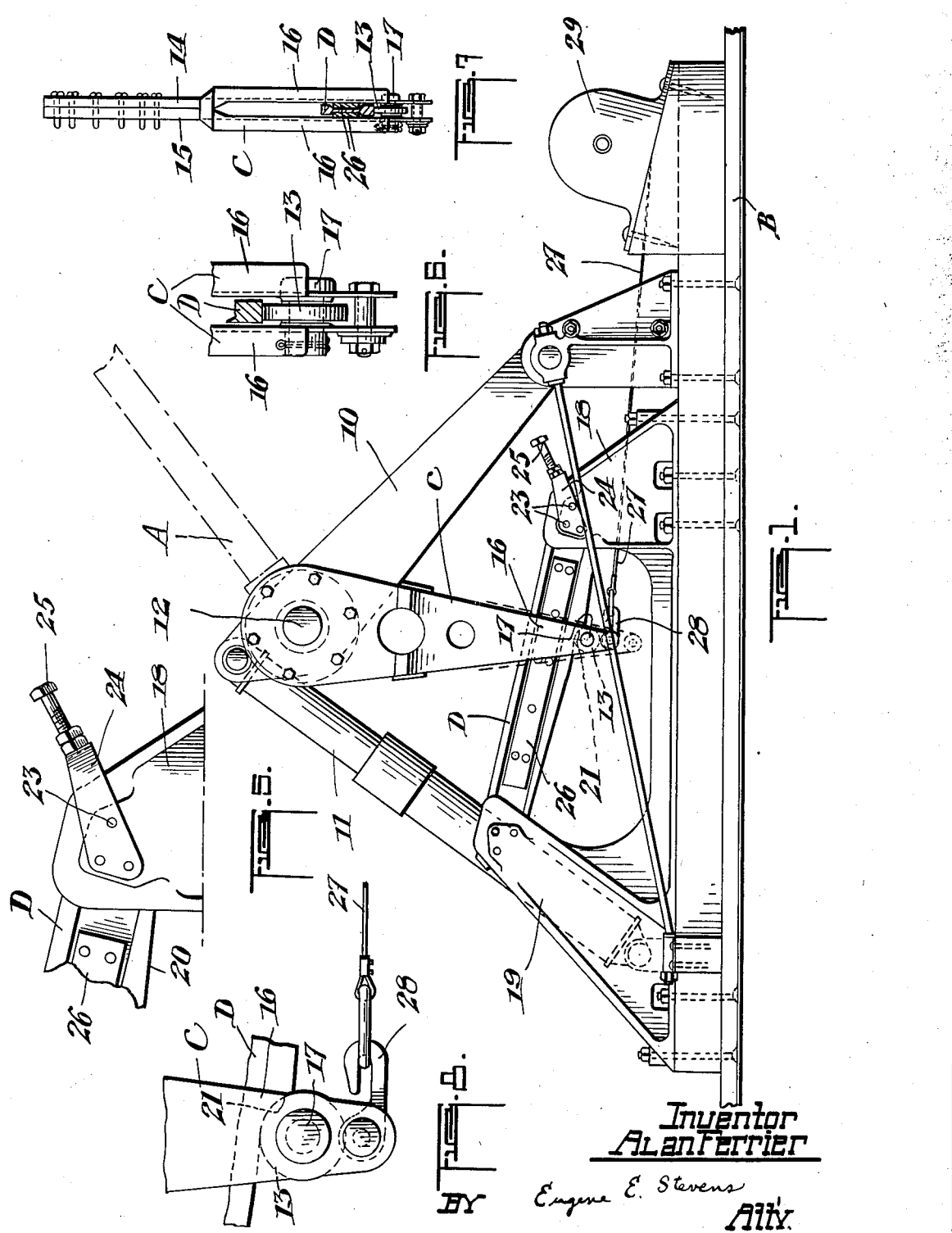
Feb. 22, 1938. A. FERRIER 2,108,962
WINTER LANDING GEAR FOR AEROPLANES
Filed July 8, 1937 3 Sheets-Sheet 1
Inventor
Alan Ferrier
By Eugene E. Stevens
Atty.

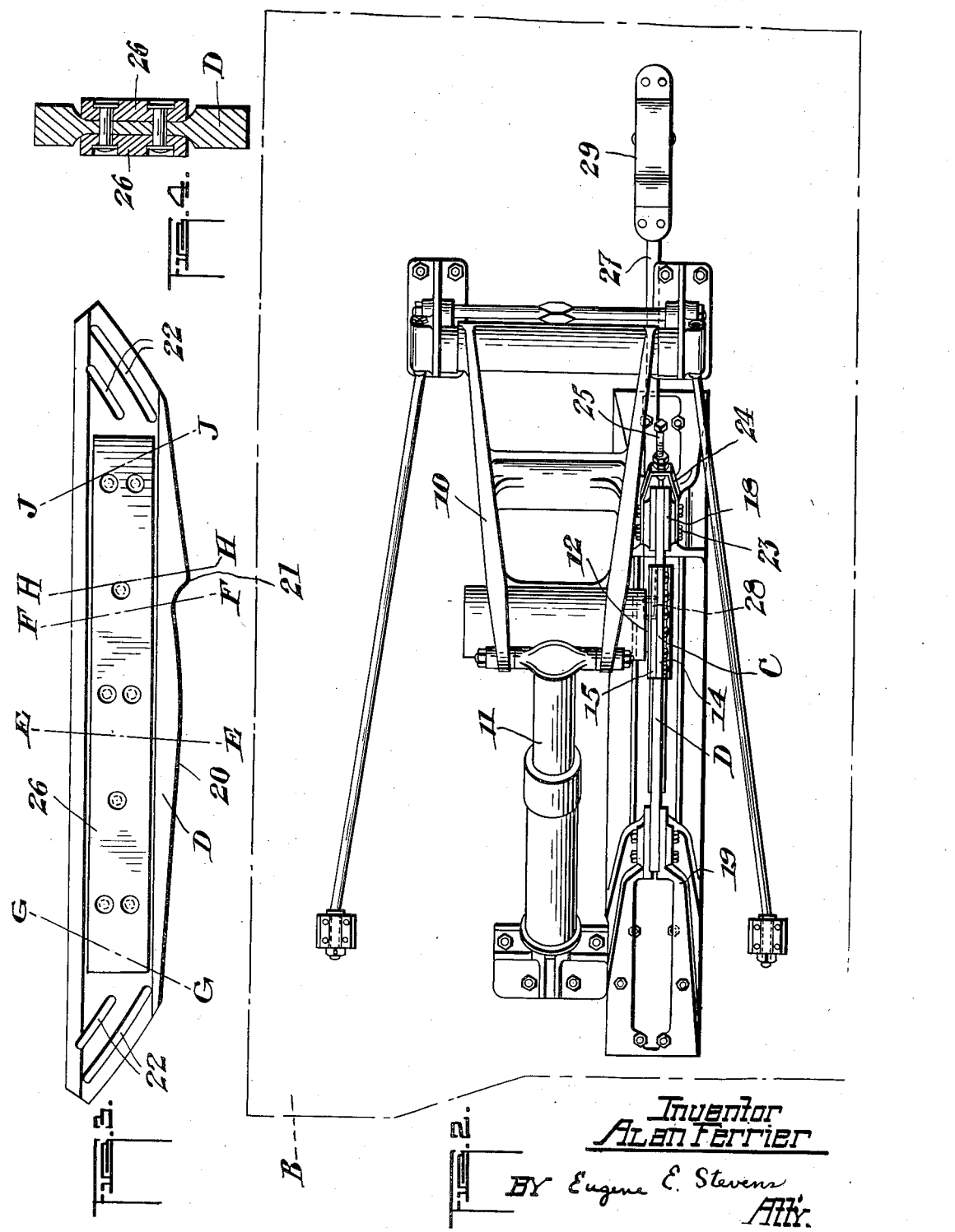

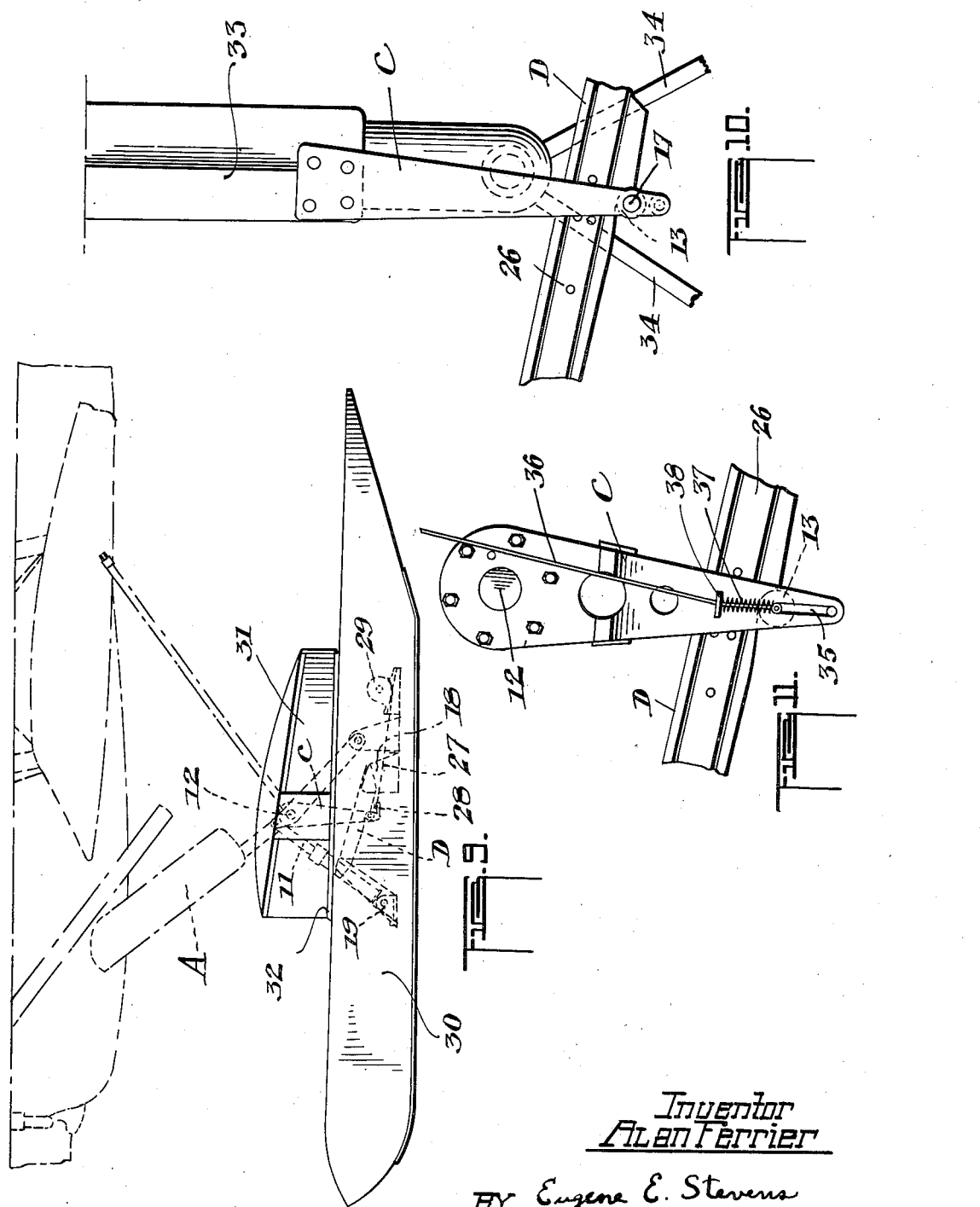

2,108,962

UNITED STATES PATENT OFFICE 2,108,962

WINTER LANDING GEAR FOR AEROPLANES

Alan Ferrier, Ottawa, Ontario, Canada, assignor to Canadian Vickers Limited, Montreal, Quebec, Canada Application July 8, 1937, Serial No. 152,637
In Canada February 27, 1937

9 Claims. (Cl. 244—108)

This invention relates to winter landing gear for aeroplanes, and more particularly to the trimming of such landing gear.

Skis are used universally in snow covered areas to take the place of the usual wheels for aeroplanes and floats in the case of seaplanes. It is necessary, of course, that the skis must move or pivot relatively to their mounting in order to permit the aeroplane to land without the possibility of the nose of the skis digging into the ground. For instance, a considerable freedom of movement must be provided for in order to permit "tail down" landing and taxiing over uneven surfaces. Similarly movement of this character is necessary when taking off and to meet most conditions an allowance for swinging movement of the skis from about 12° upwards to 33° downwards by the nose is usually made.

While it is necessary to provide for movement of the skis, it is also necessary to trim or restrain the skis against movement during the time the aeroplane is in the air. Consequently ski trimming devices which would provide for the required conditions and which would operate with the highest degree of efficiency have been the aim of aircraft designers.

In the past many proposals have been advanced and employed, examples of which are the use of rubber shock absorber cord in series with steel cable or the use of a trimming leg operating in conjunction with compression springs. Proposals of this character, however, have serious disadvantages. In the case of the former type of trimming gear, several trimming cables must be employed usually in parallel with a short length of steel safety cable to take the load when the skis reach their limit of rotation, and apart from general unsightliness they cause a considerable amount of air resistance. Moreover, the rubber shock absorber cord grows lifeless if left under tension in extremely cold weather.

In the case of the latter mentioned type of trimming, a neater structure is provided through which the air resistance factor is probably reduced to some degree, but there still remains in this structure, as well as in prior proposals at large, the fact that the ski operates under a restraining force, whether the aeroplane is on the ground or in the air, which is a fundamental limitation against ideal operating conditions.

The main object of the present invention is to provide winter landing gear for aircraft which is trimmed in such a way that the skis are automatically locked against movement while in the air and left free to move without restraint when they contact with the ground. This is accomplished by employing a trimming lever rigidly mounted on the aeroplane or its undercarriage and constructed to cooperate with a rigid member mounted on the ski with which the lever engages or disengages to lock or release the ski. This locking action is effected in response to relative movement between the undercarriage of the aeroplane and the ski, caused by an increase or reduction in the effect of aero-dynamic pressure on the wings of the aeroplane commonly referred to as increase or reduction in the "lift". In this way ideal conditions are achieved in a simple manner applicable to various types of aeroplane undercarriage in various ways.

Apart from the general simplicity of the structure in its various forms, it is complementary to skis of streamline design wherein aerodynamic forces are materially reduced and are of a well defined nature and direction of which advantage can be taken. Consequently the structure obviates the general disadvantages of the prior types of trimming gear.

In order to explain the invention clearly, reference is made to the following specification and accompanying drawings:

Figure 1 is an enlarged side elevation of one form of improved trimming gear shown as applied to a ski, the ski being illustrated fragmentarily.

Figure 2 is a plan view of the structure shown in Fig. 1, a portion of the ski being shown in broken lines.

Figure 3 is a side elevation of the trimming quadrant employed on the ski.

Figure 4 is a transverse section taken through the trimming quadrant.

Figure 5 is an enlarged fragmentary view illustrating an adjustable mounting for the quadrant.

Figure 6 is an enlarged fragmentary view showing the engagement of the roller on the trimming lever with the under surface of the trimming quadrant which is illustrated fragmentarily in section.

Figure 7 is a front elevation of the trimming lever to illustrate the manner in which it cooperates with the trimming quadrant, the latter being shown in section.

Figure 8 is an enlarged fragmentary detail showing the connection of an anti-chatter device to the lower end of the trimming lever.

Figure 9 is a general side elevation of a streamline ski for aircraft with the improved trimming gear shown in dotted lines applied thereto, a part of the aeroplane being also illustrated in dotted lines.

Figure 10 is an enlarged fragmentary view showing the trimming lever applied to a fixed portion of the elastic or shock absorbing leg of the aircraft, the trimming quadrant being also shown fragmentarily, and Figure 11 is an enlarged fragmentary detail of a trimming lever associated with a trimming quadrant which is shown fragmentarily to illustrate the application of the principle to aircraft wherein the shock absorbing devices are not disposed in the undercarriage members.

Referring to the drawings, A indicates a portion of the undercarriage of an aeroplane, and B indicates a ski mounted on the undercarriage by means of conventional mounting structure 10 including a shock absorbing leg 11, the whole being mounted from the axle 12 on the undercarriage so as to provide for pivotal movement of the ski about the axle within a predetermined range.

The invention in general may be illustrated briefly by reference to Figure 1, wherein a trimming lever C is rigidly fixed to the axle 12, for instance secured to the brake flange, and arranged to project downwardly towards the ski. The trimming lever may, of course, take various forms and essentially is provided adjacent its lower end with means to engage a rigidly disposed member on the ski, the means conveniently taking the form of a roller 13 so disposed that it may cooperate with and engage the rigidly disposed member on the ski which may be referred to as a trimming quadrant D suitably supported on and spaced from the ski so that the engaging means of the trimming lever may contact with or be disengaged from a freely exposed, specially designed surface of the quadrant as will be described in detail hereinafter.

It will be apparent, having regard to the fact that the shock absorbing leg connected between the undercarriage of the aeroplane and the ski provides for relative movement between the ski and the undercarriage so that as the ski rides on the ground the movement between the undercarriage and the ski permitted by the shock absorber under the influence of the weight of the aeroplane will disengage the roller from contact with the trimming quadrant D, thus leaving the ski free to move unstrained by trimming gear. Similarly when the craft becomes air borne the effect of aerodynamic pressure on the wings will cause the undercarriage to assume its natural position relieved of the weight of the craft and, as the shock absorbing leg 11 assumes its normal distended position, the roller 13 will engage the trimming quadrant so as to lock the ski against movement through the provision of a suitable cooperating formation on the trimming quadrant.

It will be clear, therefore, that in general the invention provides for the locking and releasing of the ski responsive to an increase or decrease respectively in the "lift" or aerodynamic pressure.

According to the specific construction shown in Figures 1 to 7, the trimming lever C is designed to straddle the trimming quadrant D, as shown particularly in Figure 7, wherein the lever is formed in two parts 14 and 15 providing spaced apart legs 16 designed to extend one on each side of the quadrant D, the legs being connected together at their ends by a suitable pin or the like 17 which is designed to carry the roller 13 which is disposed between the legs 16.

The trimming quadrant D, as shown in this instance, is of relatively narrow reinforced construction in cross section and is mounted on two suitable supports 18 and 19 which engage the ends of the quadrant. The lower edge 20 of the quadrant is specially profiled to provide for proper cooperation between the roller of the trimming lever and the quadrant whereby the roller will be caused to engage the quadrant at a definite point when it is locked with it so that the ski may be held in a definite set position during the time the craft is in the air. In this connection, upon referring to Figure 3, it will be seen that the lower edge 20 of the quadrant is provided with a shoulder 21 against which the roller 13 of the trimming lever is designed to abut when in engagement with the trimming quadrant, the shoulder corresponding with the position in which it is desired to maintain the skis during flight. Adjacent the shoulder and between the broken lines EE and FF the lower edge of the quadrant is formed with about 15° of circular profile described from the centre of the axle 12 when the shock absorbing leg 11 is fully extended. In this way the roller 13 and trimming lever are permitted under certain conditions during operation to move freely over this circular portion of the quadrant between the lines EE and FF as will be described.

The balance of the lower edge of the quadrant is formed differently so as to cause the quadrant to move relatively to the fixed lever and roller, under influence of the force exerted by the shock absorbing leg 11, when the roller engages the trimming quadrant at any place other than between the lines EE and FF or in abutment with the shoulder 21. For instance, the lower edge of the trimming quadrant between the lines EE and GG is gradually spaced away from the axle as, for example, by forming the lower edge of this portion from part of a circle whose centre is not at the axle and whose radius is greater than that employed for that portion of the quadrant between the lines EE, FF. Similarly, that portion of the lower edge of the trimming quadrant between the lines HH and JJ which is normally disposed, by reason of the depth of the shoulder, a greater distance from the axle than any other part of the lower edge of the trimming quadrant, is likewise gradually spaced away from the axle to an increasing degree. In effect, therefore, the lower edge of the trimming quadrant D between the lines EE and GG and HH and JJ has a cam-like action to force the trimming quadrant to move relatively to the trimming lever C, until they assume normal engaged position.

To illustrate the action that takes place under various conditions, assume that the aeroplane is on the ground prior to taking off. At this point the shock absorbing leg 11 of the supporting structure is compressed under static load so that the roller on the trimming lever C is disposed some distance below the trimming quadrant D and beneath the forward portion of the 15° circular profile between the lines EE and FF. The ski, of course, is free to rotate relatively to the under-carriage of the aeroplane and as the plane starts to take off and its tail comes up, the roller 13 remains free of the quadrant D but approaches the latter and comes nearer to the shoulder 21. When the aeroplane takes off with its tail still slightly below the horizontal, the roller 13 will engage the quadrant a little in advance of the shoulder 21 and on the circular profile between the lines EE and FF. The shoulder 21 will then, due to aerodynamic pressure, which tends to turn the nose of the ski upwards, be caused to engage the roller 13 to lock the ski in its set flying position.

However, if, for instance, the ski nose was depressed during take off by reason of the heel of the ski striking a bump, the roller 13 will roll along the circular profile between the lines EE and FF and climb the forward cam-like surface between the lines EE and GG. As a result the shock absorbing leg 11 would be compressed and the force exerted on the quadrant through the trimming lever would result in the cam-like surface between the lines EE and GG forcing the quadrant to move until the roller 13 engaged the circular profile between the lines EE and FF whereupon aerodynamic pressure would cause the ski to move until the shoulder 21 firmly engaged the roller B thus locking the ski in proper position. Similar action would take place where the roller 13 engaged the profile of the quadrant between the lines HH and JJ, caused for instance, by the ski nose striking a hard ridge during take off. In other words the shock absorbing leg 11 would be compressed in a similar manner and as a result of the cam-like formation of this portion of the profile, the trimming quadrant D would be forced to move until the roller had dropped down over the shoulder 21 so that the roller and trimming quadrant were locked in proper relative position. In all cases, therefore, the effect obtained is a movement of the ski to a normal predetermined flying position where it is locked against movement.

At this point it should be noted that the depression formed adjacent the shoulder 21 where the roller 13 is normally designed to lie, is formed circular, with the same radius as that of the roller 13 but with a depth a small degree less than that radius so that in the event of the ski being subjected to an irresistible force the roller will be caused to bounce out of the depression and over the shoulder with shock absorbing effect as it is subjected to the gradually increasing restraint arising from the cam-like surface of the quadrant between the lines HH and JJ. In this way the possibility of breakage of parts is avoided, as might otherwise occur if the structure was such that the shoulder 21 held the roller in an immovable manner.

The trimming quadrant is preferably mounted on the supports 18 and 19 in adjustable manner, such as by employing the slots 22 in the ends of the trimming quadrant through which suitable bolts or the like 23 (see Figure 5) are designed to be projected from the supports 18 and 19, and by employing a suitable adjusting device such as a stirrup 24 and an adjusting bolt 25 to contact with the end of the trimming quadrant the quadrant can be moved circumferentially about the axle to position its shoulder 21 correctly in relation to the position of the ski with respect to the trimming lever.

To avoid chatter, the trimming quadrant may be provided with friction strips 26 acting on the trimming lever C with some braking effect, while as a further means of avoiding chatter the trimming lever may be subjected to the mild influence of a suitable spring connected through the cable 27 by means of a suitable hook or the like 28 to the trimming lever C, the spring device being housed if desired in a casing such as 29 mounted on the ski rearwardly of the trimming structure.

It is rather necessary that the trimming structure described should be housed in a relatively watertight manner and in Figure 9 the trimming structure is shown mounted in a complementary streamlined ski structure wherein the trimming quadrant and supports, etc. are mounted in the housing 30 of the ski and part of the aeroplane axle about which the ski supporting structure pivots is disposed within a faired helmet or hood 31. This hood may be generally constructed from metal and secured to the deck of the ski in a flexible manner such as by employing a leather or fabric skirt 32, the structure being such as to permit free movement of the ski about its pivotal axis. In this way a complete and practical structure for carrying out the underlying principle of the invention is provided. However, it will be realized that varied structures may be employed to carry out this principle as, for instance, it is possible to dispose the trimming lever in a horizontal manner, whereas it is obvious that the trimming quadrant could be disposed on the aeroplane undercarriage and the trimming lever secured to the ski.

It is, of course, apparent that it is not necessary that the structure be employed with a ski carriage embodying a shock absorbing leg. For instance, the trimming lever C illustrated in Figure 10 is shown secured to the fixed portion 33 of the shock absorbing leg of the under-carriage which is connected with the ski through the rigid supports 34, the quadrant D being positioned on the ski to cooperate with the trimming lever in the manner previously described.

In Figure 11 a form of construction is illustrated that might be employed where the shock absorbing devices are not disposed in the undercarriage members of the aeroplane. In this instance the roller 13 is vertically movable in a slot 35 formed in the lower end of the trimming lever C and is held in normal position by a suitable cable or the like 36 against the pressure of a compression spring 37 normally compressed against a suitable projection boss or the like 38 on the trimming lever. Consequently, due to relative movement between the aeroplane and the ski, the cable is caused to tighten or slacken so that in flight the taut cable holds the roller in firm abutment with the quadrant, whereas, upon reduction of aerodynamic pressure in landing, a slackening of the cable permits the spring 37 to exert its pressure against the roller, thus disengaging it from the trimming quadrant D.

The operation of the invention in its various forms follows exactly the same principle in each case.

The structure illustrated in Figures 1–8 provides a suitable example of complete operation of the invention. The operation of the device during take-off, however, has been previously explained, and requires no further reference. In the case of landing, it might be pointed out, however, that during an ordinary tail down landing the trimming quadrant D is free to move about the roller 13 through the 15° or thereabouts of circular profile disposed between the lines EE and FF in Figure 3 and this is sufficient to let the aeroplane tail well down without appreciable restraint with reasonable allowance for irregularities of the ground. For instance, as the heel of the skis touch the ground and while the aeroplane is still airborne, the skis will move freely to their normal taxiing position.

When about one-quarter of the weight of the aeroplane is borne by the ski, the shock absorbing leg 11 becomes depressed and the roller 13 leaves the lower edge of the trimming quadrant D, leaving the ski free to rotate relative to the axle of the under-carriage.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

I claim:

1. In winter landing gear for aeroplanes, skis mounted for pivotal movement in landing, a rigid member mounted on each ski adapted to move therewith and complementary rigid members mounted on the aeroplane, each adapted to co-operate with one of the rigid members on the ski, each pair of cooperating rigid members being designed to engage to lock the skis against pivotal movement and to disengage to permit pivotal movement of the skis responsive to predetermined relative movements between the aeroplane and skis.

2. Winter landing gear for aeroplanes as claimed in claim 1 in which one of each pair of co-operating rigid members is formed with a profile, a portion of which forms a locking member for the cooperating rigid member when said members are engaged and a second portion is circular and described from the pivotal mounting of the ski, said second portion permitting limited unrestrained pivotal movement of the ski as it initially contacts the ground and while the aeroplane is still airborne, said locking member preventing pivotal movement upon increase in the lift when the aeroplane is in the air.

3. Winter landing gear for aeroplanes as claimed in claim 1, in which one of the rigid members is adjustable to alter the set flying position of the ski.

4. In winter landing gear for aeroplanes, skis mounted for pivotal movement in landing, a trimming quadrant rigidly mounted on each ski and movable therewith, and trimming levers mounted on the aeroplane undercarriage and disposed to cooperate with the quadrants, said trimming levers having means to engage a surface of the trimming quadrants to lock the skis against movement, each quadrant and cooperating trimming lever being engaged and disengaged through predetermined movement between the aeroplane undercarriage and the skis.

5. Winter landing gear for aeroplanes as claimed in claim 4, in which the means on each trimming lever for engaging the cooperating trimming quadrant comprise a roller positioned to project in the path of the trimming quadrant and engageable with one edge thereof.

6. Winter landing gear for aeroplanes as claimed in claim 4, in which each trimming lever is formed with spaced apart arms designed to straddle the cooperating trimming quadrant, said arms having therebetween a roller to engage a surface of said trimming quadrant.

7. Winter landing gear for aeroplanes as claimed in claim 4, in which a friction device is provided cooperating between each quadrant and trimming lever to avoid chatter.

8. In winter landing gear for aeroplanes, skis mounted for pivotal movement in landing, a trimming quadrant rigidly mounted on each ski and movable therewith, said trimming quadrant having its lower edge formed to a special profile, and trimming levers mounted on the aeroplane undercarriage and disposed to co-operate with the quadrants, said trimming levers having means to engage the special profile of the trimming quadrants to lock the skis against movement, each quadrant and cooperating trimming lever being engaged and disengaged through a predetermined movement between the aeroplane undercarriage and the skis, the special profile of the quadrants including a shoulder forming a lock for the engaging means of the co-operating trimming lever when the latter is in engagement with the trimming quadrant and a circular portion disposed in advance of the shoulder and described from the pivotal mounting of the ski, said circular portion of the profile permitting limited unrestrained pivotal movement of the ski during a predetermined movement between the aeroplane undercarriage and the skis.

9. Winter landing gear for aeroplanes as claimed in claim 8, in which the balance of the special profile of the trimming quadrant includes a portion in advance of the circular part and a portion disposed rearwardly of the shoulder, each of said two portions being gradually spaced away from the pivotal mounting of the ski to form cam-like edges to force the trimming quadrant, when engaged by the trimming lever in either of these two portions, to move relatively to the trimming lever to position the trimming quadrant and trimming lever in predetermined relative positions.

ALAN FERRIER.